UNITED STATES PATENT OFFICE.

ELHANAN W. WAKEFIELD, OF SAN FRANCISCO, CALIFORNIA.

IMPROVED MEDICINE FOR CURING FOOT-ROT IN HORSES, &c.

Specification forming part of Letters Patent No. 40,297, dated October 13, 1863.

*To all whom it may concern:*

Be it known that I, ELHANAN W. WAKEFIELD, of San Francisco, State of California, have invented and discovered a new Mode of Treating and Curing the Disease of the Horse known as the "Foot-Rot or Foot Evil;" and I do hereby declare that the following is a full, clear, and exact description thereof.

I make two preparations, as follows:

First, a wash, compounded thus: quicksilver, one-half pound; verdigris, one-half pound; concentrated lye, one-half pound; oil of organnum, one-quarter of a pound; oil of tar, one pound; powder, one pound; salt, two pounds; water, two gallons. These ingredients are to be put into a pot or basin, iron will answer, and boiled until all the materials are dissolved. This preparation I call the "wash." This wash should be applied with a sponge or rag about four to six times in twenty-four hours, and the affected parts then washed with soap. For healing, I then use a salve which I make of the following materials, the salve to be applied about twice a day until the cure is effected.

Second, a salve: Castile soap, one-half pound; lard, two pounds; beeswax, one-half pound; rosin, one-half pound; sugar, (brown,) one pound.

The first (wash) is to kill the disease. The second, (salve,) to heal and cure the inflammation; the wash to be applied hot.

The horse should be physicked lightly, and fed on hay, barley, and other light diet. He should also be bled in each leg on which the foot is diseased. While under treatment he should be kept standing on cool damp earth, and as quiet as possible.

Having thus described my invention, what I claim, and desire to secure by Letters Patent, is—

The preparation and use of the medicine herein described, for the purpose set forth, or any preparation substantially the same, which will produce the intended effect.

E. W. WAKEFIELD.

Witnesses:
JOSEPH M. BROWN,
DANL. ROWLAND.